May 8, 1962 R. B. ZIMMERLI 3,032,816
COATING PROCESS AND APPARATUS
Filed Nov. 7, 1957
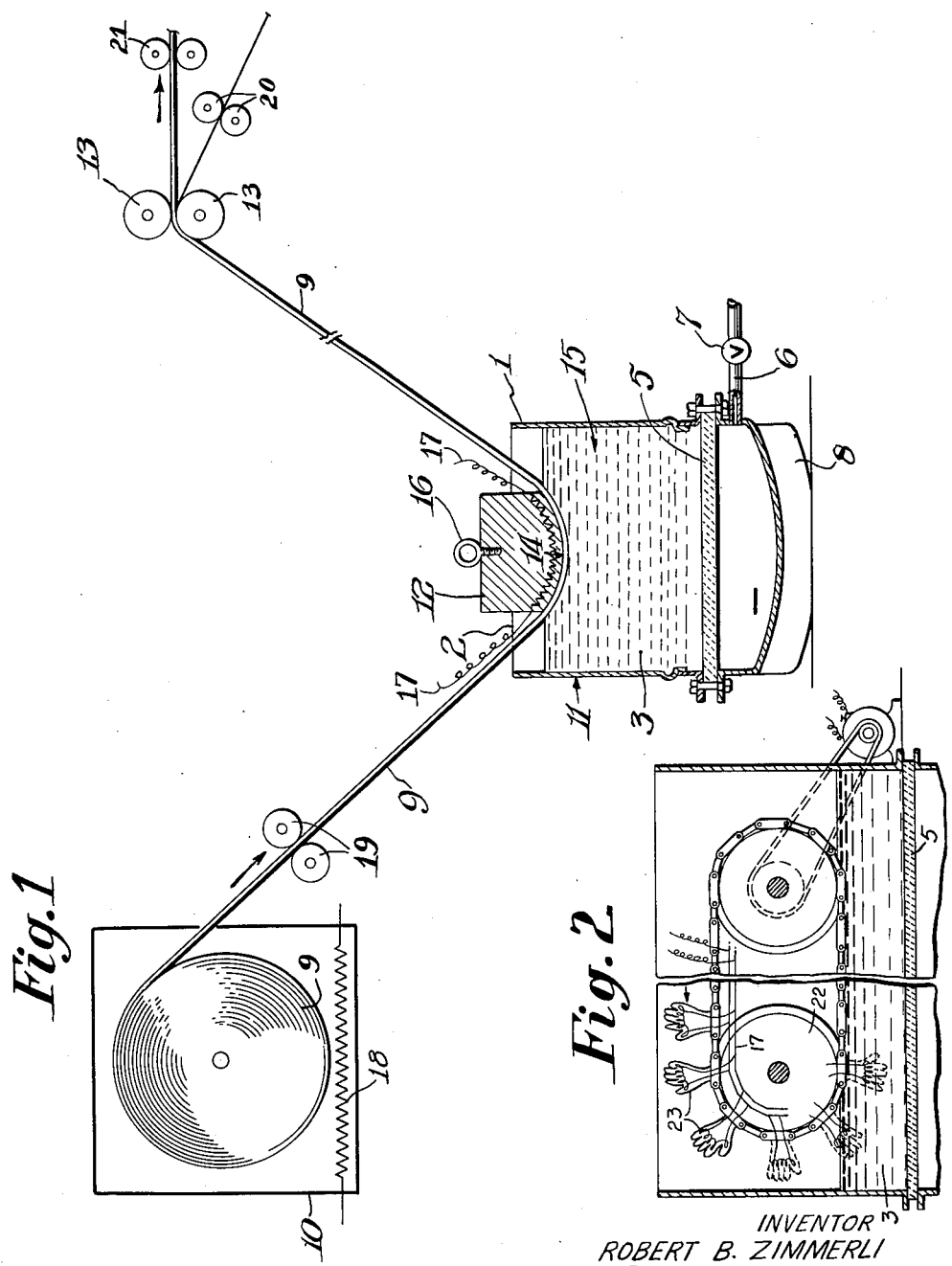
INVENTOR
ROBERT B. ZIMMERLI
BY C. H. Mortenson
ATTORNEY United States Patent Office 3,032,816
Patented May 8, 1962

3,032,816
COATING PROCESS AND APPARATUS
Robert B. Zimmerli, Reading, Pa., assignor to The Polymer Corporation, a corporation of Pennsylvania
Filed Nov. 7, 1957, Ser. No. 695,072
14 Claims. (Cl. 18—15)

This invention relates to process and apparatus for the preparation of a layer on articles, of films and of derivative products such as laminates. More particularly, it relates to apparatus for the preparation of such items through the use of fluidized beds.

There is considerable commercial activity in the marketing of coated articles which articles are coated for protecting surfaces, and for preparing a host of useful materials such as for clothing, furniture, protected coverings, packaging and industrial items, among others. Up to the present time such coating procedures have generally involved using liquids to form solutions, plastisols or dispersions of the coating material. These processes involving liquids have a number of disadvantages as, for example, cost, solvent recovery problems, avoidance of voids and the like. More efficient methods are needed.

Accordingly, an object of this invention is the provision of methods and apparatus for applying coating materials to articles without the use of liquid materials. Another object is the provision of a method and apparatus for coating articles in a direct, continuous manner. Other objectives will appear hereinafter.

As is known, thermoplastic resins may be pulverized and then held in suspension by a gas stream to form what is known as a fluidized bed. Using proper conditions heated articles such as tanks, tools and racks, may be placed in the bed and coated with smooth, continuous coverings, as described in British Patent 759,214.

A fluidized bed has been defined as a mass of solid particles which exhibit the liquid-like characteristics of mobility, hydrostatic pressure, and an observable upper free surface or boundary zone across which a marked change in concentration of particles occurs. A fluidized bed differs from a dispersed suspension in that in the suspension an upper level or interface is not formed under conditions of continuous solids entrainment and uniform superficial velocity. In general, a dispersed suspension is analogous to a vapor, whereas a fluidized bed is analogous to a liquid. In a vessel containing a fluidized bed a dilute suspension of entrained particles above the bed also is such a dispersed suspension, and is referred to as the disperse phase, while the bed itself is referred to as the dense phase.

Coatings of a large variety of materials may be readily applied to a large number of articles by placing them while at proper temperatures in the dense phase of such beds. Solid articles may be smoothly and uniformly coated and reticulate materials may be impregnated to various, controlled extents. However, in many instances it is difficult to get heat into the article to be immersed in the bed either fast enough or to an extent that the article retains the amount of heat needed. For example, a number of thin articles are incapable of retaining and storing sufficient heat to produce a coating of satisfactory thickness. Further, if one wishes to coat a thin article with a coating as thick or even thicker than the article, the problem is particularly difficult.

Thus, another objective is to provide a method and apparatus for effectively handling thin articles in fluidized bed operations. It is also desired to provide means for applying fluidized materials to articles that are difficult to get heat into, such as open or relatively open structures.

The objects of this invention are preferably accomplished by the provision of a heating means coacting with a fluidized bed. The heating means may be a mandrel, a heated shoe and the like. It is generally placed at the open top of the container holding the fluidized bed, and it is usually provided with a means for raising or lowering it in the bed. The surface is uniformly heated and it generally has a shape designed to guide the article being coated through the fluidized bed. Thus, the heating means acts as means for imparting heat to or preventing undesired heat dissipation from the article as well as means for guiding it through the bed.

The material to be applied to the article may be a naturally occurring substance or a synthetic material, inorganic or organic. The materials used have melting points or sintering points which are somewhat below the deterioration temperature of the material or article to be coated. The article on which the layer is to be deposited is heated prior to immersion in the bed or while it is immersed or both, the temperature being at least equal to, and preferably greater than, the melting or sintering point of the layering material. The article is held in the bed while it is at the said temperature and the exposed surface is contacted with the powdered particles of the coating material and the gas in the bed. The coating material flows into contact with the heated surface and is thereby heated and melted. The flow of the melt and the action of the gas usually cause any pores to fill. After the desired exposure to the fluidized bed, the article is then removed from the bed and the outer layer of powder forms a smooth surface. The articles are used directly or reprocessed if desired or converted into other articles such as laminates.

In the drawings, FIGURE 1 is a cross-sectional view of a preferred form of the apparatus of this invention, and FIGURE 2 is a detail, partly in cross-section, showing the processing of non-continuous articles in a continuous manner.

In FIGURE 1, there is shown a container 1 which may be constructed of a convenient structural material such as steel, for instance, and which has an open top as indicated at 2. The container 1 is divided by a gas pervious partition 5 into an upper chamber 3, in which the pulverulent coating material is confined, and into a pressure chamber 4. This partition, which should be pervious to the gas used but impervious to the particles of coating material, may preferably take the form of a porous ceramic plate, although other similar structures may be advantageously used. A porous plate structure which is preferred is composed of an Alundum refractory material composed of fused alumina grains bonded together with an aluminous glass at a high firing temperature. Whether composed of this or other materials, the porous plate preferably has a gas permeability which may be defined as that which will permit the passage of from one to fifteen cubic feet of air at 70° F. and 25 percent relative humidity through an area of one square foot and a plate thickness of one inch at a pressure differential equivalent to two inches of water in a period of one minute. The average pore diameter of the porous plate should preferably be in a range from 0.003 to 0.004 of an inch or less.

As shown, the container 1 is provided with a gas inlet opening 6 which is adapted for connection through a shut-off valve 7 to a suitable source of gas under pressure in order to pressurize the pressure chamber 4. The source of gas under pressure is not shown since it may consist of any conventional source such as a steel bottle of precompressed gas or, if air is to be used, a conventional air compressor and accumulation tank may be used.

When air is to be used, it is also possible to attach an air blower or pump directly to the inlet connection 6. Generally, the entire assembly is positioned on supports 8.

In one preferred form of the method of this invention, a metal sheet 9 in the form of a roll is unwound and passed from container 10, through rolls 19 if desired, to the dip tank 11. Positioned at the open top is a heated metal shoe or mandrel 12 which may be raised or lowered by any convenient means at 16. This mandrel may be the sole source of heat for the article being processed, if desired, and most frequently it is. Heating of the mandrel may be accomplished in any convenient way, as, for example, electrically as by means 17 or inductively. The thermal transfer of heat from the mandrel to the article will, of course, depend upon the conductivity of the article and its area of contact with the mandrel among other factors. In general, the entire surface of the mandrel in the dense phase is protected from being coated.

Thus, the sheet enters and leaves the tank as shown, and while in the bed, it contacts the convex surface 14 of mandrel 12. This surface is uniformly heated under the conditions in use, generally by electricity, so that sheet 9 is uniformly heated as it passes through the tank. The far side of the sheet directed toward the bottom of the tank 11 is contacted by coating material particles and the gas in the fluidized bed 15 as they travel upwards. Coating particles are thus made to contact the sheet, and are so heated and melted. Upon melting they adhere to the sheet. The coating is applied to an extent dependent upon such factors as temperature and exposure time and a uniformly coated article emerges from the tank. If desired, the coated sheet may be passed through the nip of a pair of rollers 13 which may be calender rolls to compress and smoothen the sheet coating composite to an even thickness throughout its entire length, or they may be grinding wheels adapted to remove any excess coating that is present. These rollers may be heated or cooled depending upon the results desired. After leaving the tank or the rollers, if used, the coated article 9 is further processed in the same area or wound for shipment or as shown in an alternative the film may be striped passing through rollers 20 while the base passes through rollers 21 to wind-up.

In some instances it is preferred to heat the metal sheet 9 prior to contact with mandrel 12. For this purpose the container 10 may be heated as an oven through means 18. The mandrel 12 then serves to compensate for heat losses of the sheet 9 or to provide the final additional increase in temperature necessary for coating.

The invention may be further understood by reference to the following examples which are given for illustrative purposes and are not limitative.

*Example I*

A one-foot section of steel tubing having an eight-inch diameter and a ⅝ in. wall thickness was heated in a convection oven for 40 minutes, the temperature being 800° F. Upon removal it was supported in a dip tank by means of a sleeved rod which in turn was horizontally supported by the walls of the tank. Another one-third of the outside surface of the tubing was immersed in the whirling polymer, protecting the surfaces. This fluidized material was a black pigmented nylon.

A thin aluminum foil was brought into contact with the mandrel coincident with removing the protection. The foil had a thickness of 0.0025 inch, and it was moved through the bed following the contour of the shoe at a rate of about one foot every 4–5 seconds or about 12 to about 15 feet per minute. A smooth black coating of nylon was obtained on the exposed surface of the foil. This nylon coating had an average thickness of 0.006 inch. It adhered well to the foil.

*Example II*

A roll of aluminum foil was placed in an oven and heated to a temperature of about 350° F. It was withdrawn from the oven and passed to a fluidized bed containing polyethylene as the coating material. No mandrel was used. An uneven coating resulted.

However, if the foil is passed over a mandrel of the shape and position shown in the figure a very good coating is obtained. The coating adheres well and is uniform in thickness throughout its area. The mandrel is heated to a temperature of about 400° F. and is positioned so that the foil is withdrawn from the bed directly from the mandrel so that coating on one side only is effected.

*Example III*

Tin plated steel having a thickness of 0.010 in. was passed over a heated mandrel so as to achieve a temperature of approximately 350° F. and was passed through the fluidized bed at a speed which resulted in a total immersion time of approximately 1½ seconds. The contents of the fluidized bed was a pulverulent polyethylene having a particle size of less than 40 mesh and a molecular weight of approximately 10,000.

The strip was then passed through a postheating oven at about 400° F. with a total exposure of about one minute. The resultant film of polyethylene formed upon the tin plated steel was then easily stripped away and was found to be remarkably clear and smooth and having a thickness of approximately 0.004 inch.

In certain instances the substrate from which the independent film is to be pulled is varnished prior to coating with polyethylene. Removal of the film is made easier by so doing. Other high temperature release agents may be used as, for example, polytetrafluoroethylene. A polished surface also promotes removal.

*Example IV*

A 3-inch pipe having a wall thickness of ¼ in. was heated to 600° F. and a heavy bond paper of 20 lb. weight was attached thereto to be heated by the pipe. The resultant heated paper was exposed to a fluidized low molecular weight polyethylene by immersing the unit in the fluidized bed. The immersion time was about 4 to 6 seconds. Post-heating at 500° F. for 0.5 to 1 minute was effected to fuse the coating completely. The paper had a strongly adhering, uniform coating of the wax-like polymer on one side.

In coating thin articles previously a plurality of dippings had to be used and in some cases post-heating treatments were needed. A difficulty in coating thin articles stems from the fact that it is hard to keep enough heat in the article while it is being conveyed to, in and from the bed. Because of rapid loss of heat, a good and an extensive adherence of powder is not assured. A coating is not attained and even with a succession of pre-heating, dipping and post-heating steps, the quality was poor. These difficulties are avoided using the process and the apparatus of this invention. Smooth uniform coatings are obtained in a single immersion.

If desired, the article can be passed vertically through a slotted mandrel and then through the dip tank 11, through an enclosed tunnel-like opening in the porous plate and the tank bottom. By this method both sides can be coated simultaneously. In another modification the substrate is passed through slots in the walls of the tank and made to contact a mandrel. Shields extending from the walls to the shoe, if one is used, may be provided, and the entrance edges may be rounded or provided with feed rollers outside the tank. Non-continuous articles, such as gloves, can be processed continuously by use of specially shaped mandrels on conveyors. For example, specially shaped mandrels 23 can be placed on a conveyor 22, and gloves can be produced on a continuous basis. Normally, the apparatus shown in FIGURE 1 involving flat or cylindrical mandrels over which flexible items are readily passed is preferred because of its simplicity, but it should be understood that the methods and devices described are exemplary only.

For example, the mandrels of this invention may be used in spraying techniques.

The materials which may be used for coating can contain any of many thermoplastic or thermosetting resins. Such materials have softening or melting points generally below their rapid decomposition temperatures so that they can be made to flow without vaporization or substantial decomposition. These coating materials must, of course, be capable of being pulverized so they can be used in powder form, but generally comminution is readily accomplished. The compositions may include the polyethylenes, polyamides, such as polyhexamethylene adipamide and polymerized epsiloncaprolactam, polystyrene, plasticized polyvinyl alcohol, plasticized polyvinyl acetate, acrylic resins, urea/formaldehyde resins, phenolic resins, epoxy resins, and plasticized cellulose acetate butyrate.

The coating materials are not limited to synthetic resin compositions but may include naturally occurring substances or materials derived therefrom, such as wax, shellac and asphalt such as gilsonite. Inorganic materials may also be used or included, such as metal powders and glass.

As can be seen from the above, thermosetting materials and thermoplastic materials having low melting points and high flow characteristics are employed in this invention. While higher melting and lower flow resinous materials may be used, it is especially desired to use the low melting, high flow formulations when a high degree of penetration is desired or when a heat sensitive substrate, such as paper, is being processed or if both factors are of concern. Generally, it is desirable, although not mandatory, to employ coating or impregnating materials having a flow point below 275° F. Also as noted above, it is desirable in many instances with the permanently thermoplastic materials to post-heat, and this step is, of course, mandatory for curing many of the thermosetting coating materials.

Pigments may be added as, for example, carbon black, graphite, molybdenum disulfide, titanium dioxide, and zinc oxide.

The articles to be coated may be selected from such as the following: films or foils made from metals such as aluminum, steel, tin, magnesium and the like or made from high melting plastics such as polyamides, polyesters, the various polymerized vinyls, phenolics, epoxies and the like. The substrates may also be made from glass, cellulosic fibers or other fibers. In general, thin, flexible articles of any nature can be used as substrates in this invention.

In the process of this invention, any of a number of gases may be used in fluidizing the powdered material. Generally, air or nitrogen is used. Air is preferably used for reasons of economy. The gas is supplied to the valve 7 from any appropriate source such as a compressor or a tank containing the gas under pressure. The powder may be of any mesh size but usually the granular size is between about 0.001 and about 0.024 in. and preferably between about 0.002 and about 0.012 in. The powder grain size does not have to be less than the size of any pores in the article coated. Powder having granular sizes exceeding the pore diameters may be used, for the particles melting at or near the pore flow into the pore because of melting and surface tension effects. The porous plate 5 is designed so that gas passes through it readily but powder cannot. Usually, the gas consumption is between about 70 to about 700 cubic feet per hour, the pressures being in the order of 7 inches water column.

The time of immersion of the article to be coated in the fluidized bed depends upon the thickness of the coating desired, the solids content of the bed and similar factors. As a rule, this time is kept as short as possible in order to utilize heat efficiently. The immersion may be as short as a few seconds and may last several minutes, a representative period being between about 5 seconds to about 20 seconds. In the particular form shown in the figures, the article is held by tension against the heated shoe. This is done by positioning the shoe at a depth in the dip tank dependent on the speed of the traveling article and other factors. By maintaining the tension at a proper amount, the fluidized particles can contact only one side of the article. Coating of both sides may be effected, if desired, simply by passing a sheet, preheated if desired, through a slotted mandrel in the dip tank. The sheet may be suspended as a catenary as it comes from the mandrel, but in any event coating occurs on both sides.

The heating elements may be protected at their ends to prevent powder adherence by use of flanged end caps or by cooling the ends, preferably internally. The sheet that can be so treated can be of any width. Strips that are 10 feet to 20 feet wide are easily handled and the maximum width is that at which the strip can be manufactured. If desired, rollers or support bars (not shown) may be positioned outside of the dip tank and adjacent to the mandrel. The sheet is thus supported and it can be directed into the tank at the best angle and tension as desired. The rollers may be drive rolls.

One aspect of the process of this invention is the manufacture of laminates. Pieces of sheet coated separately or continuously can be bonded to themselves or other coated articles or uncoated articles readily. For example, individual strips can be coated, and the resultant coated material may be pressed into laminated or random formed thermoset molded articles or materials by application of proper heat and or pressure. Filled molded resin articles are thus very easily prepared.

This invention is very advantageous in processing certain materials having limited solubility. For example, nylon has not been used extensively as a coating nor as a resinous binder because there are no solvents for it that are cheap and easy to handle. By the process of this invention laminated, nylon-bonded structures are easily made. Likewise, laminated sheets of nylon are readily produced.

In the preparation of laminates, it is especially advantageous to use a saturation grade paper, such as kraft. The resulting impregnated paper has a deep penetration of impregnant greater in degree than occurs in filled papers such as bond or Manila papers. This deep penetration is desired for the great strength of the bonding it affords in the laminates. It is also desired in those instances where complete protection of the web is desired, as, for example, in producing waterproof articles.

Structures produced by the process of this invention can be passed directly from the dip tank to other processing elements for final fabrication. For example, resultant coated sheets, films, or foils can be planished, dyed, printed and the like in the same area thereby reducing handling, storing and shipping expenses. The products of this invention are useful in many ways, as, for example, in containers, electrical capacitors, moisture-proof and moisture-resistant articles, as industrial and decorative high pressure laminates, floor and wall coverings, upholstery for the home and vehicles, draperies and shower curtains, industrial belting, clothing articles, shoe components, woven and non-woven rugs, among others.

The process of this invention has several distinct advantages over solution methods. No inflammable solvents are needed, and expensive solvents and recovery steps are obviated. The process of this invention can be adjusted so that in most instances the desired coating is obtained without the multiple treatments that are usually encountered in solvent processes. While porosity causes difficulty when solvents are present due to surface tension effects, porosity is no handicap in the methods of this invention. Still further, many polymeric materials which have poor solubility or are difficult to handle in the presence of solvents because they gell, "ball-up" or precipitate prematurely can now be used as coating materials. The process of inventions herein is clean, speedy and efficient. Thin articles which lose their heat rapidly

I claim:

1. A process for forming a coherent layer of material on a surface of an article comprising producing a fluidized bed of substantially dry, solid, pulverulent layer-forming material by passing an ascending distributed current of gas therethrough; positioning a body capable of being heated to a temperature at least as high as the melting point of the said layer-forming material in the dense phase of the fluidized bed; positioning said article in the dense phase of the fluidized bed and in heat-exchange relationship with said body which is heated for thermal transfer of heat from the resultant heated body to said article to form a layer of the pulverulent material by fusion upon the surface of the article; and then removing and cooling the article.

2. A process in accordance with claim 1 in which the said article is a flexible article.

3. A process in accordance with claim 1 in which the said article is a continuous, flexible article.

4. A process in accordance with claim 1 in which the surfaces of the said article to be treated are substantially non-porous.

5. A process in accordance with claim 1 in which said article is a thin metallic material.

6. A process in accordance with claim 1 in which the resultant layer is stripped from the resultant treated article.

7. A process for forming a coherent layer of material on a surface of a continuous, flexible article comprising fluidizing a pulverulent, layer forming material in a vessel; positioning a heated body in the fluidized, pulverulent material; passing said continuous article in heat-exchange relationship with said body for thermal transfer of heat from it to said continuous article; contacting the resultant article, heated at least to the fusion point of the said layer forming material, with the said pulverulent material thereby forming said layer; and removing from said vessel the resultant article having a layer of said material on those surfaces of said article exposed to said layer forming material.

8. A process in accordance with claim 7 in which said article being processed is a thin metallic material.

9. A process for forming a coherent layer of material on a surface of an article which comprises fluidizing a pulverulent, layer forming material in a vessel; positioning a body in the fluidized, pulverulent material which body is capable of being heated to a temperature at least equal to the fusion point of the said layer forming material and which body has a section having a shape substantially conforming to the shape of the article to be treated; passing said article in heat-exchange relationship with said body and heating said body to a temperature at least equal to the fusion point of the said layer forming material for thermal transfer of heat from the resultant heated body to the said article; contacting the resultant article heated at least to the fusion point of the said layer forming material with the said pulverulent material thereby forming said layer; and removing from said container the resultant article having a layer on its exposed surfaces.

10. A process in accordance with claim 9 which includes preventing said heated body from being contacted by said layering material.

11. Apparatus comprising a fluidized bed container having an open top and a porous bottom for the admission of an ascending current of fluidizing gas; a fluidized pulverulent layering material in said container, a heated mandrel positioned within the open top of said container for transmitting heat by thermal transfer to an article on which a layer is to be deposited while the article being treated is in contact with said fluidized bed of pulverulent layering material within said container; and means for bringing the said article into heat-exchange relationship with the said heated mandrel.

12. Apparatus comprising a fluidized bed container having an open top and a porous bottom for the admission of an ascending current of fluidized gas; within said container a pulverulent layering material; a heated mandrel positioned within said open top for transmitting heat by thermal transfer to an article on which a layer is to be deposited while the article being treated is in contact with said pulverulent material in a fluidized state; means for leading said article to said mandrel to be heated thereby; and means for guiding the resultant article from said container.

13. Apparatus in accordance with claim 12 in which said mandrel presents a regular, continuous surface to said article in effecting said heat transfer.

14. Apparatus in accordance with claim 12 in which said mandrel effecting said thermal transfer has a special shape substantially conforming to the shape of the article to be treated.

References Cited in the file of this patent

UNITED STATES PATENTS

| | | |
|---|---|---|
| 915,672 | Harrington | Mar. 16, 1909 |
| 1,193,883 | Emery | Aug. 8, 1916 |
| 2,120,720 | Spanel | June 14, 1938 |
| 2,332,309 | Drummond | Oct. 19, 1943 |
| 2,685,121 | Davis et al. | Aug. 3, 1954 |
| 2,804,397 | Goodman | Aug. 27, 1957 |
| 2,844,489 | Gemmer | July 22, 1958 |
| 2,852,811 | Petriello | Sept. 23, 1958 |

FOREIGN PATENTS

| | | |
|---|---|---|
| 759,214 | Great Britain | Oct. 17, 1956 |

OTHER REFERENCES

Gemmer: "Das Wirbelsinterverfahren," Plastverarbeiter, September 1956, pp. 342–348 (pp. 347 and 348 and 17, 18 and 21 of translation relied on).